United States Patent [19]

Skobel

[11] 3,744,947

[45] July 10, 1973

[54] APPARATUS FOR FORMING RIGID WEB-REINFORCED COMPOSITES

[75] Inventor: Max Skobel, Edison, N.J.

[73] Assignee: Dow Corning Corporation, Midland, Mich.

[22] Filed: Jan. 20, 1972

[21] Appl. No.: 219,427

[52] U.S. Cl................ 425/114, 264/40, 264/149, 264/174, 425/142
[51] Int. Cl................................................ B29f 3/10
[58] Field of Search.................. 425/114, 142, 314, 425/289, 113; 264/40, 148, 149, 174; 83/371

[56] References Cited
UNITED STATES PATENTS

| | | | |
|---|---|---|---|
| 2,826,782 | 3/1958 | Dugall et al. | 425/114 X |
| 3,433,858 | 3/1969 | Bauer et al. | 425/114 X |
| 3,459,851 | 8/1969 | MacPherson | 425/114 X |
| 3,477,126 | 11/1969 | Price | 425/114 X |
| 3,555,127 | 1/1971 | Messer et al. | 264/40 |
| 3,557,403 | 1/1971 | Lemelson | 425/142 X |
| 3,646,894 | 3/1972 | Hasten et al. | 425/315 X |

*Primary Examiner*—J. Spencer Overholser
*Assistant Examiner*—Richard Bernard Lazarus
*Attorney*—Robert F. Fleming, Jr., Howard W. Hermann et al.

[57] ABSTRACT

Apparatus for forming rigid web-reinforced extruded composites in which a pair of webs are fed through an extrusion die in spaced parallel relationship, the die being shaped to form two extrusions joined in mirror image relationship and wherein the extrusions are pulled through a curing station and past a slitter knife by driving the reinforcing webs. The slit extrusions can then be cut to length. Useful applications include windshield wiper blades and seals.

4 Claims, 5 Drawing Figures

Patented July 10, 1973

APPARATUS FOR FORMING RIGID WEB-REINFORCED COMPOSITES

BACKGROUND OF THE INVENTION

The present invention relates to apparatus for forming rigid web-reinforced extruded composites and, more particularly, also relates to a method of vehicle windshield wiper blades using such apparatus.

Motor vehicle windshield wiper blades can be characterized as comprising a generally triangular cross-section elongated strip of elastomeric material to which is affixed a metallic reinforcing strip which urges the elastomeric material into contact with a vehicle windshield and which also serves as attachment means for attaching the wiper blade to the wiper arm. In the manufacture of wiper blades it is a common practice to mold the elastomeric material in mirror image back-to-back relationship; i.e., with the wiping edges at opposite sides of the molded configuration. The mold is shaped to produce suitable notches in the finished product for attachment of the metallic backing strip to the configuration. The molded configuration after removal from the mold is split to provide two separate blades and the wiping edges are trimmed to remove flash and provide a smooth wiping edge. The molded elastomeric parts are then attached to the metallic backing strips providing a finished blade suitable for mounting on the vehicle wiper arm. Of necessity, this prior art method, while producing satisfactory results, introduces a number of handling steps which results in substantial cost to the operation. Additionally, a certain amount of material is necessarily wasted in the trimming operation.

SUMMARY OF THE PRESENT INVENTION

It is therefore an object of the present invention to provide a method of making windshield wiper blades which is more efficient than those known heretofore.

In accordance with this and other objects, there is provided by the present invention apparatus for forming windshield wiper blades by means of extrusion. The apparatus described hereinafter virtually automates the production of vehicle windshield wiper blades and is also readily adaptable to the manufacture of other shaped elastomer composites such as metal backed door seals, for example. In accordance with the present invention a pair of rigid reinforcing webs are passed in parallel spaced relationship through an extruder die in which an uncured elastomeric material is extruded onto the strips in a desired configuration. For windshield wiper blades the die conforms in shape to a pair of wiper blades joined in mirror image relationship at their wiping edges, instead of back to back as in the prior art. The extruded composite is pulled through a curing station, which in the case of heat vulcanizing rubber may be simply a hot air oven, by means of a capstan which drives the two parallel supporting webs. The composite is then slit at its center providing a pair of elongated composites, each being a single windshield wiper blade or seal in cross-sectional configuration. The slit composite can then be cut to desired length or, alternatively, rolled until ready for use.

The use of an extruder eliminates the multiple steps present in the prior art and also eliminates waste in that only a single slitting operation is required. There is no need for trimming of flash from the extrusion and in the case of windshield wiper blades a clean wiping edge results directly from the slitting operation.

BRIEF DESCRIPTION OF THE DRAWINGS

Other objects and advantages of the present invention will become obvious to those skilled in the art from a reading of the following detailed description when read in connection with the accompanying drawings wherein.

DESCRIPTION OF THE PREFERRED EMBODIMENTS

Figure 1:
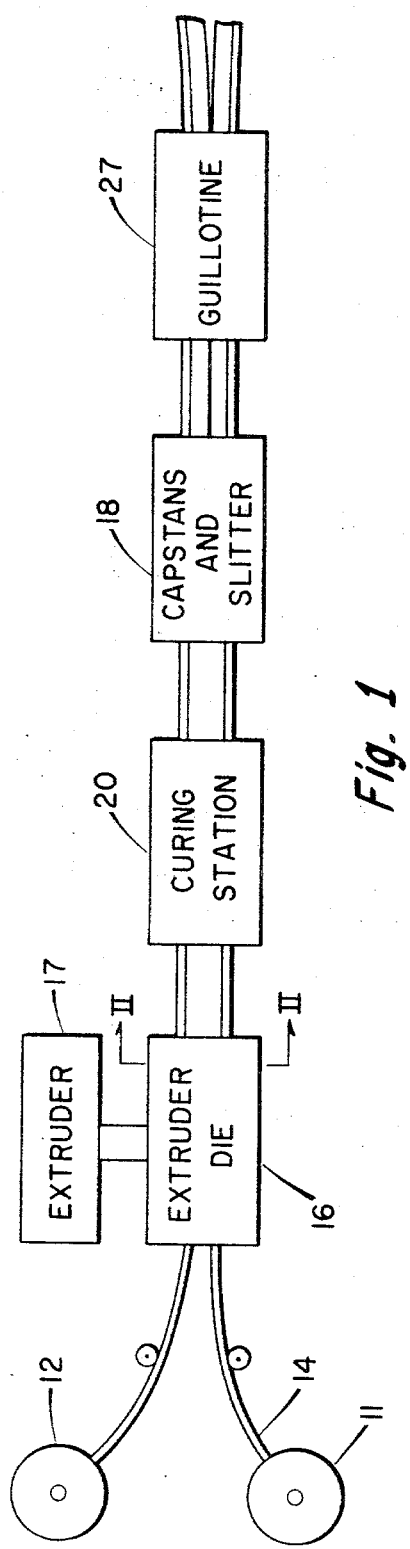
FIG. 1 is a diagrammatic overall view of apparatus according to a preferred embodiment of the present invention.

Referring now to the drawings wherein like reference characters designate like or corresponding parts throughout the figures thereof, there is shown in FIG. 1 a pair of web supply means 11 and 12 for feeding a pair of webs 13 and 14 into an extruder die 16 fed by an extruder 17. In the extruder die 16 an uncured elastomeric material is extruded onto the webs 13 and 14 in the desired configuration as shown by the cross-section in FIG. 2. The webs 13 and 14 are preferably perforated to allow strike-through of the material and extrusion onto both sides of the web thereby thoroughly embedding the webs in the extruded material. It is to be understood, however, that if sufficient adhesion is obtained by the use of suitable priming agents or by the nature of the materials used, the use of the perforated web is not an absolute necessity.

Figure 2:
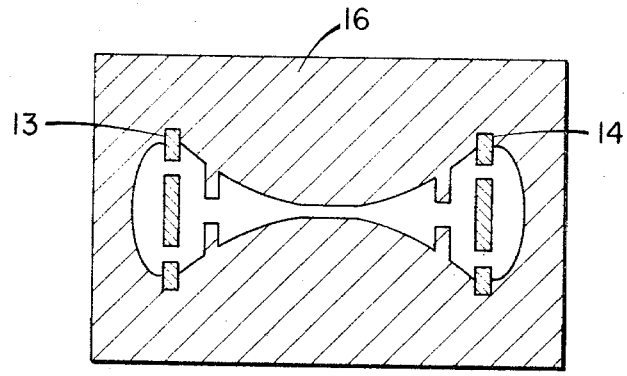
FIG. 2 is a cross-section of the extruder die of the apparatus taken through the plane II—II of FIG. 1 with the reinforcing webs in place in the die.

As may be seen from FIG. 2 the shape of the extruder die conforms in shape to a pair of windshield wiper blades having their wiping edges joined to form a mirror image relationship to each other. The exact configuration of the blades is a matter of design from the functional standpoint and it is to be understood that the shape shown is merely for illustrative purposes.

The extruded composite after leaving the die 16 is pulled through a curing station 20 by a capstan and slitter system 18. In the case of heat-vulcanizable materials the curing station may be simply a hot air oven having suitable guide rollers conforming to the webs placed therein, with the oven length and operating temperatures dependent upon the specific materials being extruded. Such factors are well known to those skilled in the art and need not be described in detail herein.

Figure 3:
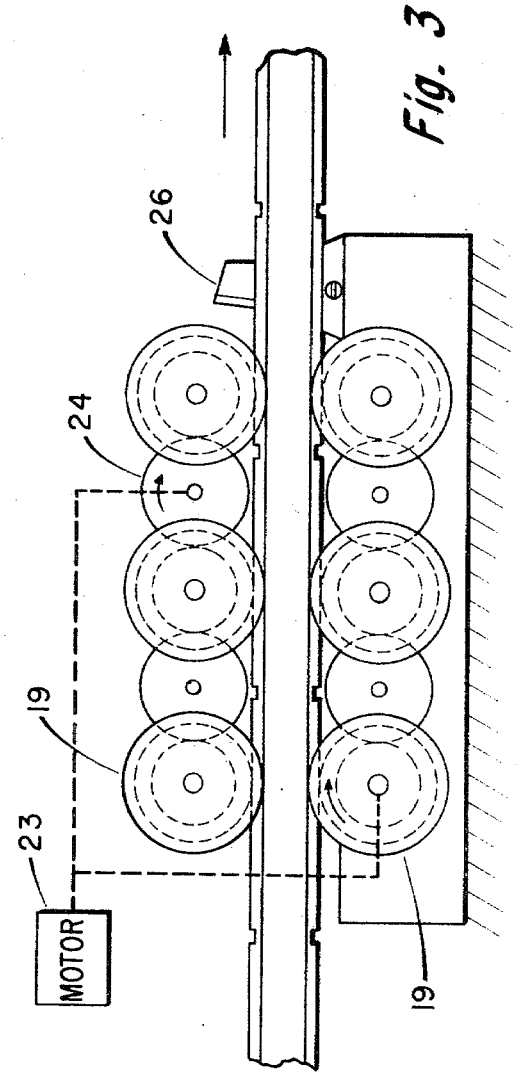
FIG. 3 is a side-view, partially diagrammatic, of the capstan system of the apparatus of FIG. 1.
Figure 4:
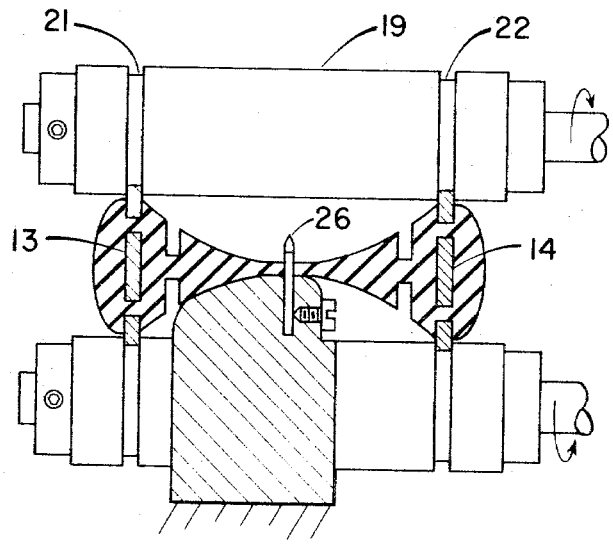
FIG. 4 is a partial cross-sectional view through the apparatus of FIG. 1 showing an endview of the capstans.

Referring now specifically to FIGS. 3 and 4, the capstans are designed to drive the composite solely by use of the edges of the reinforcing webs 13 and 14. Each of the rollers 19 has a pair of areas 21, 22 of reduced diameter adapted to contact the peripheral edges of the strips 13 and 14 to propel the same through the system. The rollers are driven by means such as a motor 23 which drives the shaft of one of the rollers 19 on one side of the web and the shaft of one of the connecting wheels 24 on the opposite side to provide the correct rotational direction for forward movement. While three drive rollers 19 are provided at each edge of the composite as shown in FIG. 3, it is to be understood that the number shown is merely exemplary and any desired number may be provided. The drive means described for the rollers is also to be understood to be exemplary and not limiting.

Immediately adjacent the capstan is a slitter knife 26 held in place in the center of the composite configuration for dividing the composite into its two elements in so far as cross-section is concerned. In the case of windshield wiper blades it is possible to place cutting means such as a guillotine 27 along the path of travel to periodically chop the extruded composites into desired lengths, resulting in finished blades. Notches 28 on the reinforcing strips 13, 14 may be utilized to automatically activate the guillotine. The guillotine 27 may, however, be omitted and the resulting composite simply coiled until ready for use.

Figure 5:
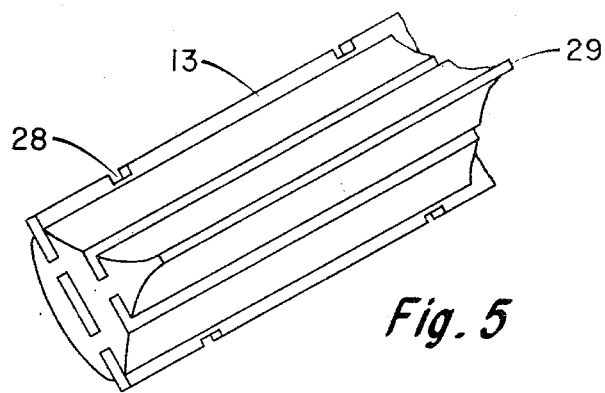
FIG. 5 is a view in perspective of a finished windshield wiper blade made in accordance with the present invention.

As shown in FIG. 5, the finished windshield wiper blade includes the exposed edges of one of the backing webs 13 or 14 so that the device may be readily affixed to a windshield wiper arm making use of the notches 28 provided periodically along the length of the reinforcing web 13 or 14. The cut edge 29 of the blade which edge was formed by the slitter 26 is sufficiently smooth to provide a good wiping surface with no further trimming. No flash exists anywhere on the composite. The device is thus ready for use as it leaves the apparatus.

It is to be understood that while the apparatus has been disclosed specifically with reference to the manufacture of windshield wiper blades, it may be easily adapted to the production of various types of rigid reinforced seals and other configurations simply by changing the extruder die and the capstan rollers. For example, door and window seals having metal backing strips may be made in this manner.

Various modifications and variations of the present invention will become obvious to those skilled in the art from a reading of the foregoing description. It is therefore, to be understood that within the scope of the appended claims the invention may be practiced as otherwise described.

That which is claimed is:

1. Apparatus for forming rigid web-reinforced extruded composites comprising:
   an extruder having an extrusion die conforming in shape to a pair of said composites joined in mirror image relationship to each other,
   web supply means for feeding a pair of reinforcing webs into said die in spaced parallel relationship,
   supply means for feeding a curable elastomeric material into said extruder,
   a curing station positioned adjacent the output end of said die along the path of travel of the pair of extruded composites,
   a slitting knife positioned along the path of travel at the point of division between the pair of extruded composites to cut the elastomeric material and to separate the same into individual composites by continuous longitudinal splitting,
   drive means engageable with the edge portions of said reinforcing webs to draw said webs from the web supply means, through said extruder die, and past said slitting knife, and
   cutting means positioned at the end of the path of travel of the extruded composite for periodically cutting both of said pair of extruded composites to finished lengths wherein indexing notches are provided along the peripheral edge of said reinforcing webs to activate said cutting means at desired intervals.

2. Apparatus as defined in claim 1 wherein said reinforcement web is perforated to allow strike-through of the extruded material in the extrusion die.

3. Apparatus as defined in claim 1 wherein said extruded composites are vehicle windshield wiper blades, said extrusion die conforms in shape to a pair of blades joined at the wiping edges thereof and said slitting knife forms the wiping edges of said blades.

4. Apparatus as defined in claim 3 wherein said reinforcing webs form the backing members and attachments means for said windshield wiper blades.

* * * * *

UNITED STATES PATENT AND TRADEMARK OFFICE
CERTIFICATE OF CORRECTION

PATENT NO. : U.S. 3,744,947
DATED : July 10, 1973
INVENTOR(S) : Max Skobel

It is certified that error appears in the above-identified patent and that said Letters Patent are hereby corrected as shown below:

In column 1, line 7, "a method" should read

--the manufacture--.

In column 4, lines 41 and 42, the word "attachments"

should read --attachment--.

Signed and Sealed this

Twelfth Day of May 1981

[SEAL]

Attest:

RENE D. TEGTMEYER

Attesting Officer    Acting Commissioner of Patents and Trademarks